United States Patent
Kim et al.

(10) Patent No.: US 9,871,839 B2
(45) Date of Patent: Jan. 16, 2018

(54) SEAMLESS MULTICAST AND UNICAST SWITCHING FOR CONTENT PLAYBACK

(71) Applicant: Verizon Patent and Licensing Inc., Arlington, VA (US)

(72) Inventors: Dong P. Kim, San Jose, CA (US); Johannes P. Schmidt, Los Altos Hills, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 197 days.

(21) Appl. No.: 14/799,084

(22) Filed: Jul. 14, 2015

(65) Prior Publication Data
US 2017/0019439 A1    Jan. 19, 2017

(51) Int. Cl.
G06F 15/16 (2006.01)
H04L 29/06 (2006.01)
H04L 29/08 (2006.01)

(52) U.S. Cl.
CPC ........ *H04L 65/4076* (2013.01); *H04L 65/601* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 7,385,978 B1* | 6/2008 | Yang | ....................... | H04L 12/66 370/390 |
| 2008/0219154 A1* | 9/2008 | Durrey | ............... | H04N 7/17309 370/225 |
| 2008/0256409 A1* | 10/2008 | Oran | ..................... | H04L 1/0009 714/748 |
| 2015/0163532 A1* | 6/2015 | Shmueli | ........... | H04N 21/23418 386/326 |

* cited by examiner

*Primary Examiner* — Esther B Henderson

(57) ABSTRACT

Content streams, such as video streams, may be seamlessly provided as both multicast and unicast transmissions. For example, in one implementation, a mobile device may receive a request, from a user of the mobile device, to play streaming content at the mobile device. The mobile device may receive, from a wireless network, and using multicast techniques, a sequence of content segments that correspond to the requested streaming content, and determine when a content segment is missing from the sequence of content segments. The mobile device may request, in response to the determination of the missing content segment, the missing content segment, from the wireless network, using unicast techniques; and insert the received missing content segment into the sequence of content segments to obtain the sequence of content segments as a sequence that includes content segments received using both multicast and unicast techniques.

20 Claims, 9 Drawing Sheets

SEAMLESS MULTICAST AND UNICAST SWITCHING FOR CONTENT PLAYBACK

BACKGROUND

In an increasingly networked world, more and more traffic, such as data, voice, and video, is transmitted over public and proprietary networks. Wireless networks, in particular, are becoming increasingly popular as networks through which subscribers obtain both voice services (e.g., telephone calls) and data services (e.g., email and video/audio streaming). Streaming video services, in particular, may be provided through a wireless network.

When providing content, such as video, over the wireless network, it may be important to intelligently deliver the content to the mobile devices to limit strain on the wireless network. One known technique for streaming audio/video is known as multicast, in which a single channel may be used to broadcast content to multiple mobile devices. In contrast, with a unicast transmission, video streams transmitted to multiple mobile devices may require multiple channels that are each dedicated to a single mobile device.

A multicast system may include a number of multicast channels that are broadcast, over a radio interface, to interested mobile devices. For example, content providers may make available video streams, such as streams of live events, that may be transmitted as a multicast transmission. Multicast may be particularly useful for streaming video of live events or scheduled broadcasts, in which a relatively large number of users may be interested in viewing the video stream at the time the stream is broadcast using multicast.

DETAILED DESCRIPTION OF PREFERRED EMBODIMENTS

The following detailed description refers to the accompanying drawings. The same reference numbers in different drawings may identify the same or similar elements.

As described herein, a broadcast service may be provided in which content streams, such as video streams, may be seamlessly provided as both multicast and unicast transmissions. A mobile device may use the multicast stream, of a particular content stream, as the primary technique for receiving the content stream. Playback, at the mobile device, of the content stream, may be provided after a predetermined delay from reception of the content stream via multicast. For example, for a content stream that is broadcast as a number of discrete segments of content, a certain number of segments may be buffered before being played back to the user of the mobile device.

Particular content segments that are not correctly received via multicast (e.g., a missing content segment, a content segment received with too many errors, etc.) may be requested via unicast and, when received, may be inserted into the buffer to supplement the correctly received multicast content segments. The predetermined delay from reception of the content stream to playback of the content stream may be selected in order to allow the unicast process to "fill in holes" (missing content segments) in the buffer due to issues with the multicasting of the content stream.

Figure 1A:
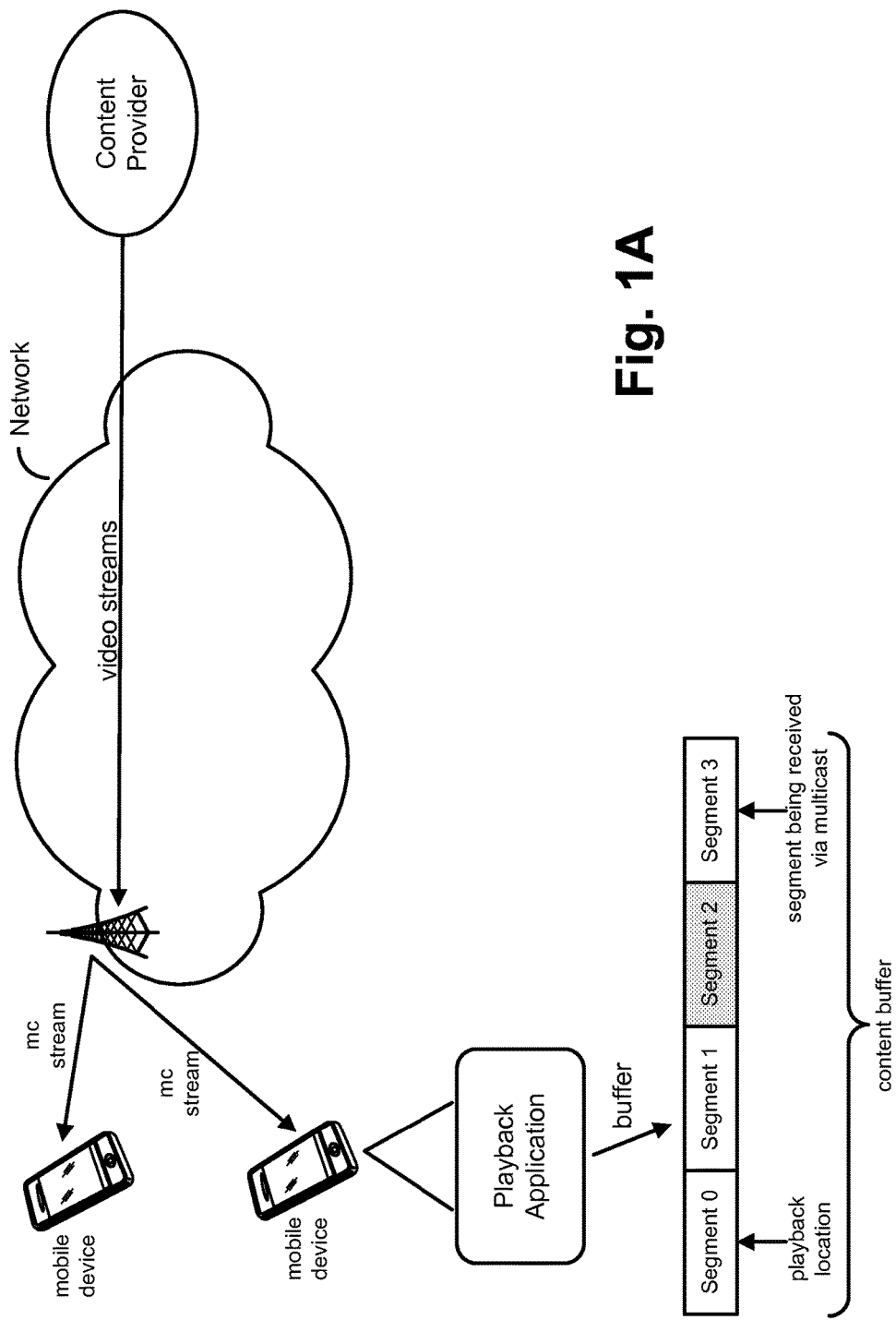
FIGS. 1A and 1B are diagrams that conceptually illustrate an example of an overview of concepts described herein.
Figure 1B:
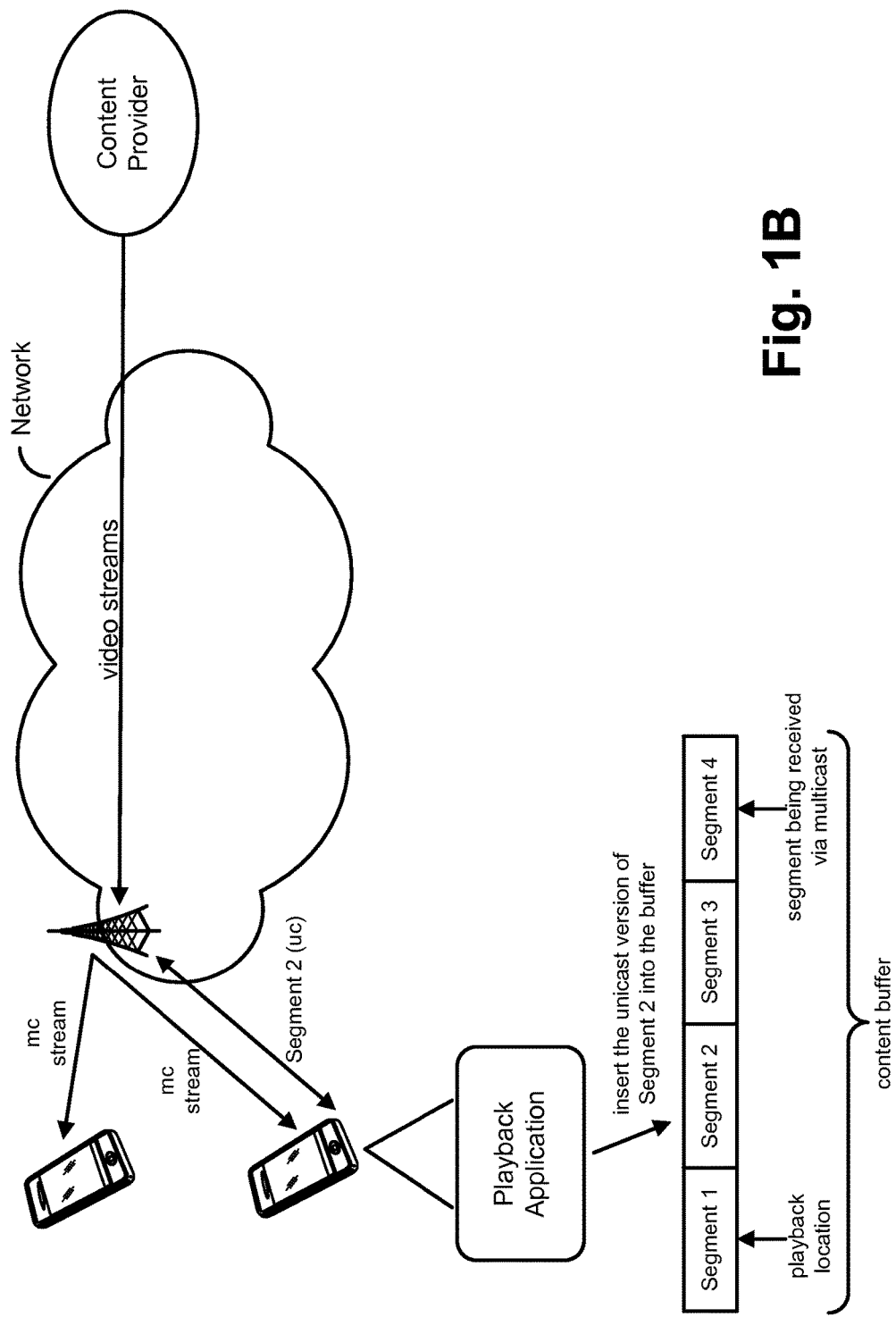

FIGS. 1A and 1B are diagrams that conceptually illustrate an example of an overview of concepts described herein. As shown in FIG. 1A, mobile devices, such as smart phones, may obtain network connectivity from a network, such as a wireless network. The network connectivity may allow for a number of network services, including the streaming of content. The streamed content may be provided by a content provider that provides, for example, video streams to the mobile device. The video streams may be streams of live events, streams of scheduled broadcasts (e.g., television programming), or other streams that are likely to be simultaneously viewed at multiple mobile devices.

Each of the mobile devices may include a playback application to playback, to the user of the mobile device, the streamed content. As illustrated in FIG. 1, the playback application may receive a multicast stream ("MC stream") from the content provider. The same multicast stream may be received by multiple mobile devices and the stream may be encoded as a number of discrete sequential segments. The playback application may store the received segments in a buffer. In FIG. 1A, four received segments are illustrated as: Segment 0, Segment 1, Segment 2, and Segment 3. Assume that Segment 3 represents that segment that is currently being received via multicast (i.e., the segment containing the most recent video from the stream), and Segment 0 represents the segment that is currently being played to the user of the mobile device.

Segment 2 is shown in FIG. 1A with a shaded background, indicating that Segment 2 was not correctly received via the multicast. For example, due to interference, a weak multicast signal, or other factors, Segment 2 may not have been received or may have been received with a high error rate that causes the quality of the video associated with Segment 3 to be low. In response, the playback application may request Segment 2, such as from the content provider, via a unicast transmission.

As shown in FIG. 1B, Segment 2 may be received via unicast (uc) and be written into the content buffer such that, when the current playback location corresponds to Segment 2, the playback application may use the unicast version of Segment 2. The playback of the video stream, at the mobile device, may thus be seamless (e.g., may proceed without interruption) despite the fact that both multicast and unicast technologies are used to receive the data.

Using unicast and multicast to seamlessly receive a content stream, as described herein, has a number of potential advantages. For example, when using only multicast, content stream startup times may be increased relative to unicast. With the techniques described herein, the content player may begin the content stream using unicast to thus potentially improve stream startup times. Further, by using both multicast and unicast, a more robust content stream may be obtained relative to using only unicast or multicast. At the same time, however, when multicast is available for a content stream, the content player, as described herein, may use the multicast content stream to take advantage of the efficient use of the radio spectrum that is obtained through multicast.

Figure 2:
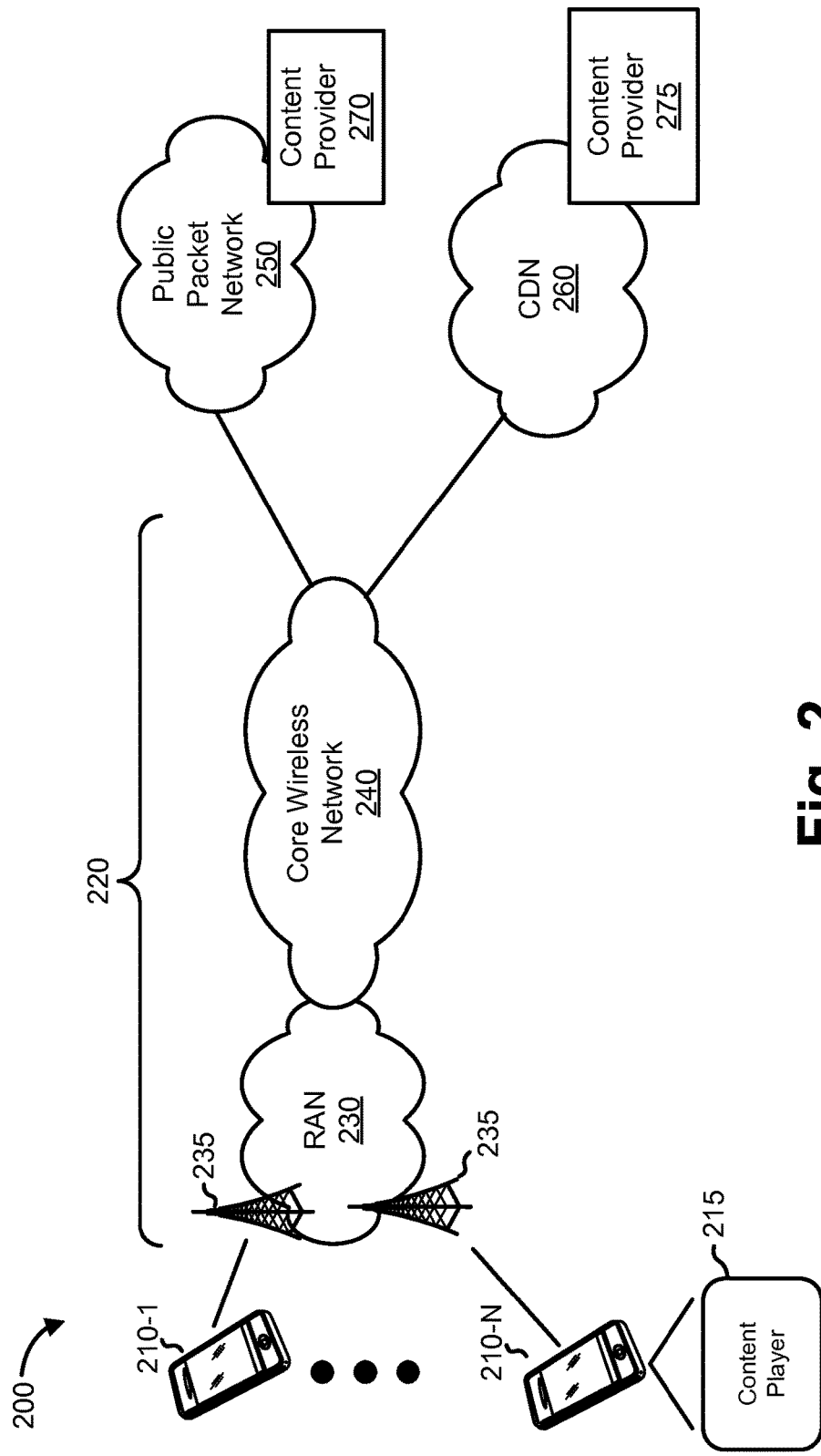
FIG. 2 is a diagram of an example environment in which systems and/or methods described herein may be implemented.

FIG. 2 is a diagram of an example environment 200 in which systems and/or methods described herein may be implemented. As illustrated, environment 200 may include one or more mobile devices 210-1 through 210-N (referred to collectively as "mobile devices 210" or singularly as "mobile device 210"). Mobile devices 210 may obtain network connectivity through wireless network 220 (e.g., a cellular network). Wireless network 220, as illustrated, may include radio access network (RAN) 230 and core wireless network 240.

One or more additional networks, such as public packet network 250 and content delivery network (CDN) 260, may connect to wireless network 220. Content provider 270 may include one or more devices, such as content servers, that deliver content (e.g., streaming audio or video) to mobile devices 210. Content provider 275 may similarly include one or more devices, such as content servers, that deliver content to mobile devices 210. The content, from content provider 270 and/or content provider 275, may be delivered, over RAN 230, as multicast content and/or unicast content.

Mobile devices 210 may include portable computing and communication devices, such as a personal digital assistant (PDA), a smart phone, a cellular phone, a laptop computer with connectivity to a cellular wireless network, a tablet computer, etc. Mobile devices 210 may also include non-portable computing devices, such as desktop computers, consumer or business appliances, set-top devices (STDs), or other devices that have the ability to connect to RAN 230. Mobile devices 210 may connect, through a radio link, to RAN 230. Through the radio link, mobile devices 210 may obtain data and/or voice services, such as content delivery services via which content (e.g., streaming video, streaming audio, or other content) may be delivered to mobile devices 210.

Mobile devices 210 may include logic, illustrated as content player 215, to play content, received from content provider 270/275, to a user of the corresponding mobile device 210. Content player 215 may function to receive user selection of a content stream to play, and in response, initiate wireless reception of the content stream from RAN 230. The content stream may be received as a sequential series of segments that each represent a portion (e.g., a one second section) of the content. Content player 215 may seamlessly use both multicast and unicast techniques to receive the content stream. In one implementation, and as will be described in additional detail below, playback application may begin reception of a content stream via unicast. If a multicast broadcast is available for the content stream, content player 215 may seamlessly switch to preferentially using multicast to receive the content stream but may still use unicast techniques to request segments (or packets) in the content stream that are not received, or are received with errors, via multicast.

Figure 3:
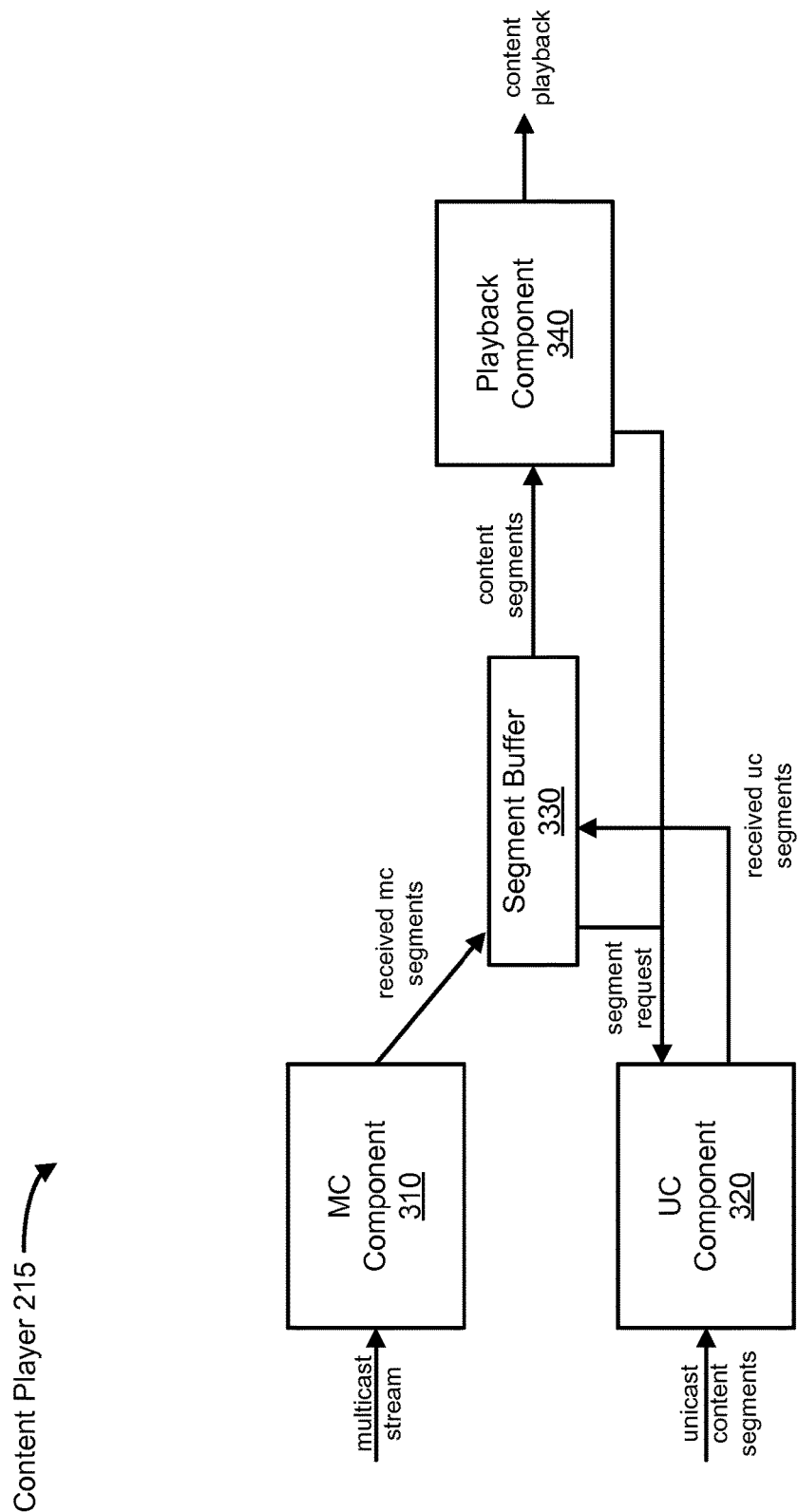
FIG. 3 is a diagram conceptually illustrating an example of functional components of a content player.

RAN 230 may include one or more devices that include radio interfaces to provide wireless connections to mobile devices 210. RAN 230 may provide wireless connectivity for wireless network 220. RAN 230 may include, for example, one or more base stations 235. Each base station 235 may provide one or more radio interfaces over which the base station may communicate with mobile devices 210. The radio interfaces may include, for example, orthogonal frequency-division multiplexing (OFDM) and/or single-carrier frequency-division multiple access (SC-FDMA) based radio interfaces. In the context of a network such as a long term evolution (LTE) network (e.g., as illustrated in FIG. 3), base stations 235 may be referred to as evolved Node Bs (eNodeBs).

Core wireless network 240 may implement a network that provides routing, control, and data transmission services for mobile devices 210. Core wireless network 240 may connect to one or more other networks, such as to public packet network 250 and/or CDN 260, to provide network services to mobile devices 210. Core wireless network 240 may include one or more network devices used to implement control logic, physical links, and routing/switching functions that may be performed by core wireless network 240. In one implementation, core wireless network 240 may implement an LTE network.

Public packet network 250 may include one or more packet networks, such as an Internet Protocol (IP) based packet network. Public packet network 250 may include a wide area network (WAN), a local area network (LAN), and/or combinations of WANs and LANs. Mobile devices 210 may access public packet network 250 to obtain computation and/or data services from computing devices, such as from content provider 270.

CDN 260 may include one or more networks designed to provide content, such as streaming content delivered via multicast, to mobile devices 210. CDN 260 may include a wide area network (WAN), a local area network (LAN), and/or combinations of WANs and LANs.

Content providers 270 and 275 may each include one or more server devices that provide content, such as on-demand video content, to mobile devices 210. A content provider 270/275 may, for example, be an entity that has the rights to provide television content, other video content, radio content, etc. Content provider 270 may provide content, destined for mobile devices 210, via public packet network 250 and wireless network 220. Similarly, content provider 275 may provide content, destined for mobile devices 210, via CDN 260 and wireless network 220.

Although FIG. 2 illustrates example components of environment 200, in other implementations, environment 200 may contain fewer components, different components, differently arranged components, or additional components than those depicted. Alternatively, or additionally, one or more components of environment 200 may perform one or more other tasks described as being performed by one or more other components of environment 200.

FIG. 3 is a diagram conceptually illustrating an example of functional components of content player 215. As shown in FIG. 3, content player 215 may include multicast (MC) component 310, unicast (UC) component 320, segment buffer 330, and playback component 340.

Multicast component 310 may receive content, such as streaming video, using multicast or broadcast techniques. Multicast may refer to one-to-many distribution in which base stations 235 use a single communication channel to broadcast data to multiple mobile devices 210. For example, in LTE networks, the Enhanced Multimedia Broadcast Multicast Services (E-MBMS) may provide a multicast implementation for sending the same content to all the users in a cell (broadcast) or to a given set of users (subscribers) in a cell (multicast) using a subset of the available radio resources. Multicast at the radio interface level, such as performed with E-MBMS, provides for sharing of radio resources at the radio access level.

Unicast component 320 may receive content, such as streaming video, using unicast techniques. Content received by unicast component 320 may be content that is transmitted to mobile device 210, by wireless network 220, using radio resources that are used dedicated to mobile device 210. Unicast communications may be a one-to one connection between mobile device 210 and a base station 235 of wireless network 220.

As previously mentioned, streamed content, such as streamed video content, may be provided in discrete segments, where each segment corresponds to a particular length (e.g., in time) or a particular file size. The segments may be labeled, such as via sequential numbers, so that playback component can reassemble the segments into the correct playback order and/or determine when a particular segment is missing. Multicast component 310 and unicast component 320 may both operate to receive content data and output corresponding content segments.

Segment buffer 330 may include a software and/or hardware implemented data structure that is used to store the received content segments. The received content segments may be content segments from multicast component 310 and unicast component 320. Segment buffer 330 may generally operate to store the content segments before the content segments are played, to the user, by playback component 340. By buffering the content segments in segment buffer 330, content player 215 may ensure that content segments are correctly ordered for playback. Additionally, buffering the content segments may allow content player 215 to request content segments that were not received or erroneously received via multicast. For example, as illustrated in FIG. 3, segment buffer 330 may receive (and buffer) multicast segments from multicast component 310 ("received mc segments"). Content segments that are missing in segment buffer 330 may be requested via unicast ("segment request"). The request may be generated by segment buffer 330 and/or playback component 340. Unicast component 320 may receive the request and, in response, may request a particular content segment(s) from wireless network 220 (e.g., by transmitting a unicast request, for one or more particular content segments, to base stations 235 and/or content providers 270/275). Content segments, received by unicast component 320, may be stored in segment buffer 330 ("received uc segments").

Playback component 340 may read the content segments from segment buffer 330 and playback the corresponding content to the user (e.g., as video or audio). For example, the content segments may be encoded using one or more media encoding techniques, such as by using MPEG-DASH (Moving Picture Experts Group-Dynamic Adaptive Streaming over HTTP (Hypertext Transfer Protocol)), HTTP Live Streaming (HLS), Smooth streaming, etc. Playback component 340 may decode the segments and playback the content, to the user, as a continuous audio or video stream.

Figure 4:
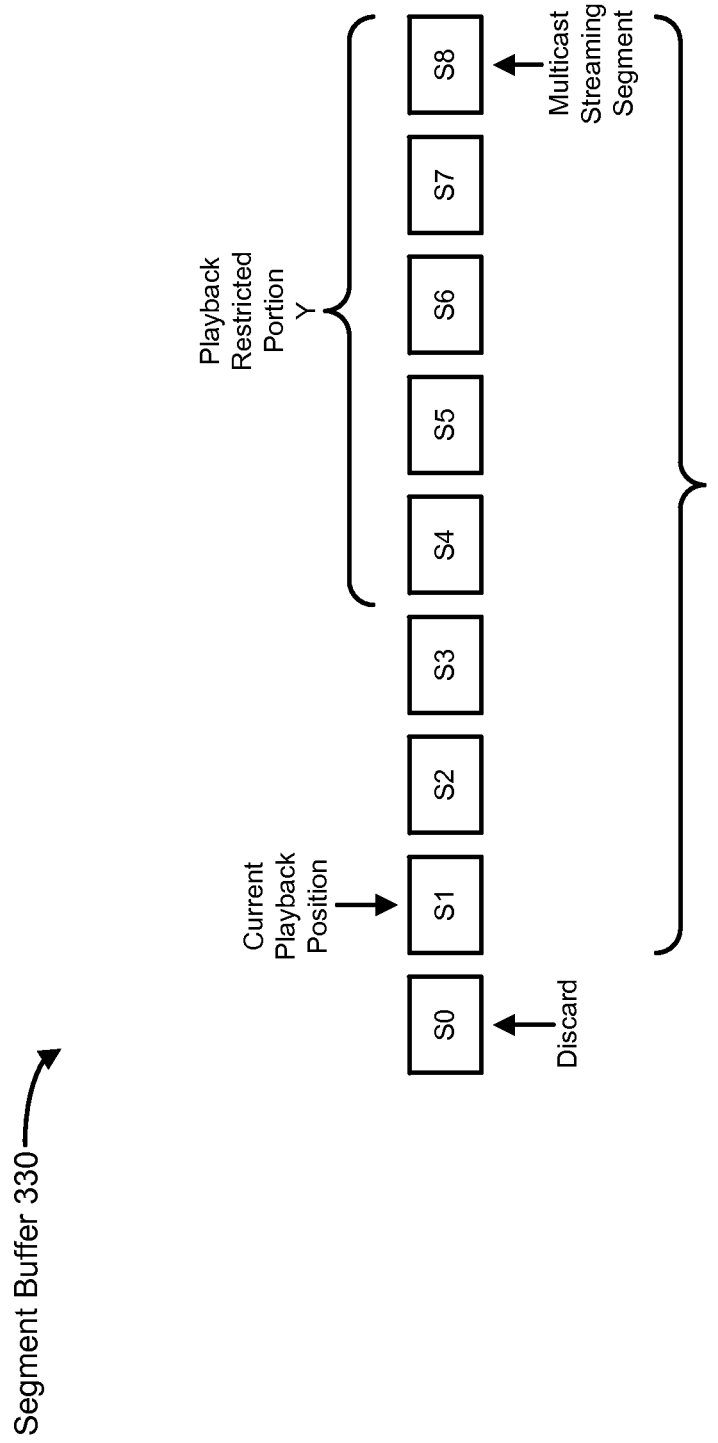
FIG. 4 is a diagram conceptually illustrating an example of functional components of a segment buffer.

FIG. 4 is a diagram conceptually illustrating an example structure of segment buffer 330. As shown in FIG. 4, segment buffer 330 may store a number of content segments, each illustrated as a rectangle. Each content segment may correspond to a particular portion of the overall content stream and the content segments may be sequential (i.e., the content segments are ordered).

In the example of FIG. 4, nine content segments, labeled as segments "S0" through "S8" are illustrated. S0 may represent the beginning of the content stream and S8 may represent the most recent portion of the content stream. For a multicast transmission of a live event, S8 may thus represent the most recently received content segment and may correspond to the current or "live" frame of the event ("multicast streaming segment"). As is further shown in FIG. 4, assume segment S1 is the segment that is currently being played by playback component 340 ("current playback position"). S0 has been already been played by playback component 340. In implementations in which pausing and rewinding of streaming content is not a feature that is provided by content player 215, S0 may be discarded. In implementations in which pausing and rewinding of streaming content is a feature provided by content player 215, segment buffer 330 may continue to store played content segments, such as by storing a number of played content segments equal a desired maximum amount of streaming content that is available for rewind.

As is further shown in FIG. 4, segment buffer 330 may be defined by a buffer length "X," which may refer to the target size of the content buffer from the most recently received content segment to the content segment corresponding to the current playback position. Buffer length X may correspond to the delay experienced by a user, viewing a particular content stream, relative to the "live" position of the content stream (i.e., relative to the most recently received content segment of the content stream). Segment buffer 330 may enforce a playback restriction corresponding to a certain buffer length "Y," which may refer to the number of most recently received content segments that are not available for playback by playback component 340. In other words, content buffer 330 may enforce a minimum delay Y between the current multicast segment that is being received and the current playback position.

Figure 5:
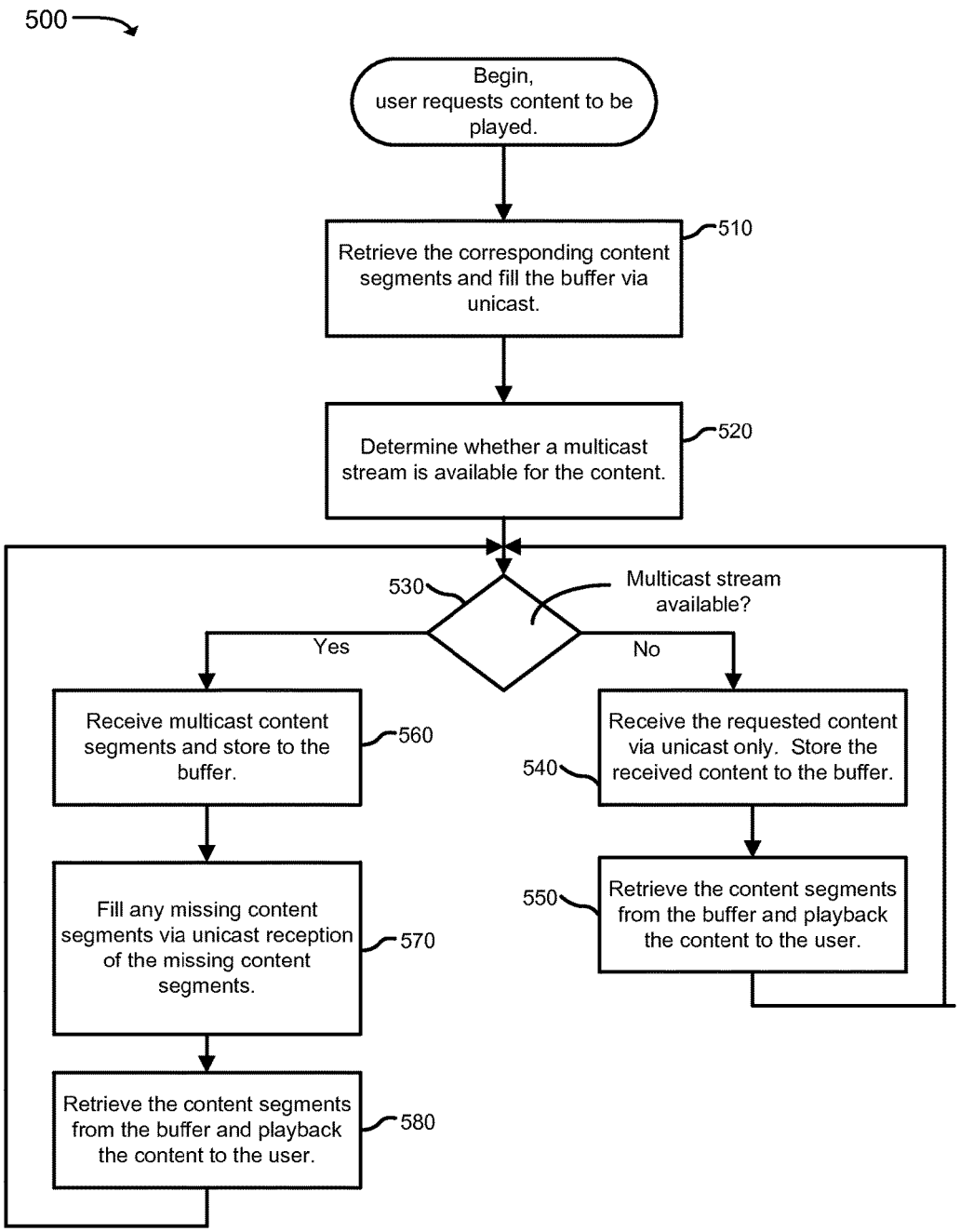
FIG. 5 is a flowchart illustrating an example process for seamless multicast and unicast switching during content playback.

FIG. 5 is a flowchart illustrating an example process 500 for seamless multicast and unicast switching during content playback. Process 500 may be performed, for example, by a mobile device 210, such as by content player 215 of mobile device 210. Process 500 may be performed when a user requests video or audio content, such as a video stream or audio stream, from one of content providers 270/275. The content may be a stream that corresponds to a live event (e.g., a sporting event, a music concert, etc.) or to scheduled programming, such as a television channel, that a relatively large number of users are likely to concurrently view. The content stream may be delivered wirelessly (e.g., over radio interfaces associated with base stations 235) to mobile devices 210.

Process 500 may include retrieving the content segments, corresponding to the content, via unicast (block 510). The retrieved content segments may be stored in segment buffer 330. In this implementation, in response to a user request for content, the content may be initially requested via unicast. The time delay to request and to begin to receive content may be shorter when received as a unicast transmission than a multicast transmission. Accordingly, by initially requesting a content stream as a unicast transmission, the lag between the initial request for the content and the beginning of playback of the content may be minimized.

In some implementations, content stored or broadcast by content providers 270/275 may be provided as encrypted content segments in which, for a particular content stream, multiple different encodings, corresponding to different quality settings, may be maintained. For example, a particular content stream may be encoded at three different bit rates, which may correspond to three different playback quality levels. In general, content encoded at a higher quality setting may take up more space and may thus require more network throughput to stream the content using wireless network 220. In some implementations, as part of the initial requesting of the content, mobile device 210 and content provider 270/275 may determine an appropriate quality level for the content. Also, in some implementations, as part of the initial requesting of the content, mobile device 210 may receive decryption keys for the content segments.

Process 500 may further include determining whether a multicast stream is available for the content (block 520). For example, mobile device 210 may query content provider 270/275 (or another network device) to determine whether the particular requested content is currently being streamed via multicast. Alternatively or additionally, mobile device 210 may receive a control channel, associated with wireless network 220, that includes an indication of content that is currently being streamed via multicast. Although blocks 510 and 520 are shown sequentially in FIG. 5, in some implementations, the operations corresponding to blocks 510 and 520 may be performed concurrently (or in the reverse order). That is, mobile device 210 may initially receive the content via unicast while at the same time determining whether a multicast stream is available and initiating reception of the multicast stream (if it is available).

When a multicast stream is not available (block 530—No), mobile device 210 may continue to receive the content stream via unicast. In particular, in this situation, process 500 may include receiving the requested content via unicast only and storing the received content to the buffer (block 540). In this situation, segment buffer 330 may be filled by unicast component 320. Playback component 340 may retrieve the content segments from the buffer and playback the content to the user (block 550).

When a multicast stream is available (block 530—Yes), process 500 may include receiving the multicast content segments and storing the received multicast content segments in the buffer (block 560). For example, multicast content component 310 may receive the multicast (or broadcast) transmission, extract the content segments from the multicast transmission, and store the content segments to segment buffer 330. As previously mentioned, the current content segment that is being received by multicast content component 310 may correspond to the most recent (newest) content segment of the content stream. If the content segment stream is also being received via unicast (e.g., due to the initial unicast request that was made in block 510), mobile device 210 may cease the reception of the content segments the unicast, such as by transmit a request to content provider 270/275 to cease the transmission of the unicast stream.

In some situations, reception of a multicast transmission may result in missed content segments or content segments that are received with greater than a threshold level of errors or that are otherwise not acceptable for playback of the content. These missing content segments may be referred to as "holes" in the sequence of content segments. In this situation, process 500 may include filling missing content segments via unicast reception of the missing content segments (block 570). For example, in one implementation, logic associated with segment buffer 330 or playback component 340 may examine segment buffer 330 and determine when a content segment is missing (e.g., when the sequentially labeled content segments are missing a label) or contains too many errors (e.g., greater than a threshold number of errors or lower than a threshold quality). In this situation, unicast component 320 may transmit a request, to base stations 235, content providers 270/275, or other network devices, for the missing content segment or segments. When unicast component 320 receives a corresponding missing content segment or segments, unicast component 320 may store the missing content segment or segments to segment buffer 330. In this manner, content segments that are not correctly received via multicast may be dynamically obtained via unicast. The parameters relating to segment buffer 330 (e.g., the buffer length X and the playback restricted portion Y) may be selected, potentially based on current network conditions, to allow for enough time for missing content segments to be filled via unicast before the content segments are used by playback component 340.

Process 500 may further include retrieving the content segments from the buffer and playing back the content to the user (block 580). Retrieval and playback of the content may be performed by playback component 340. The operations of block 580 may be similar to those of block 550.

Process 500, as discussed, may provide for seamless switching between multicast and unicast reception of a content stream. Multicast, when available, may be used as the primary technique for receiving the content stream. When multicast becomes unavailable or when content segments are not correctly received via multicast, the content stream may continue to be received via unicast.

Figure 6A:
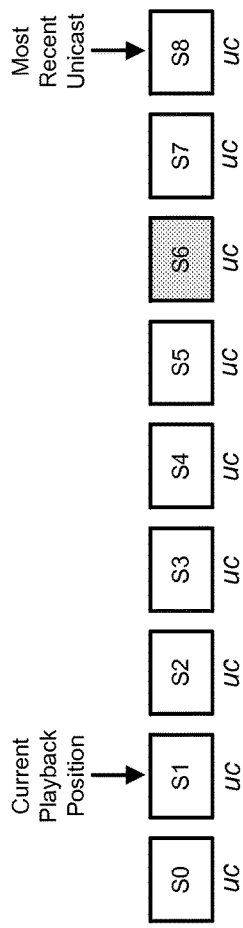
FIGS. 6A-6C are diagrams illustrating an example application for seamless multicast and unicast switching for content playback.
Figure 6B:
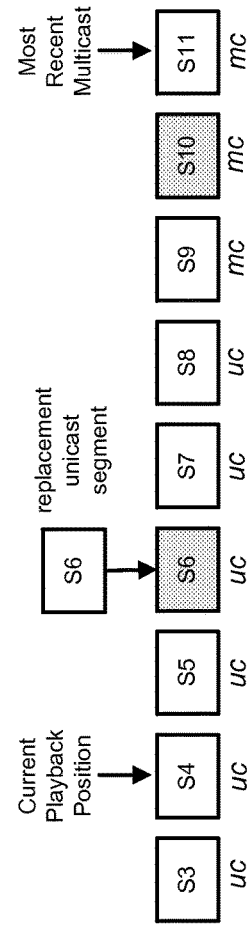
Figure 6C:
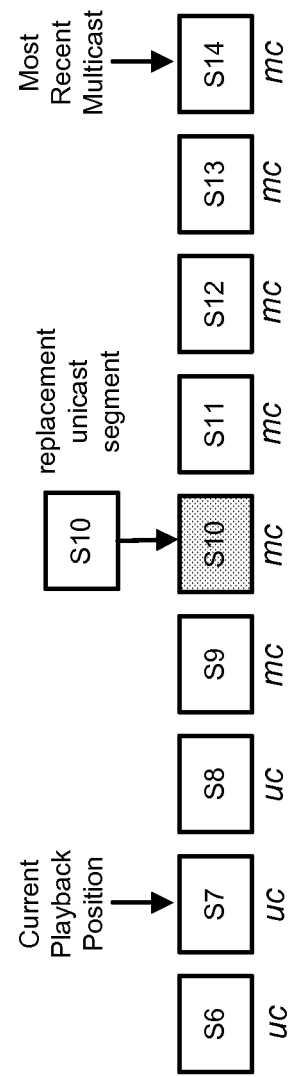

FIGS. 6A-6C are diagrams illustrating an example application of the previously discussed concepts for seamless multicast and unicast switching for content playback.

In FIG. 6A, assume that a user of a mobile device has requested streaming content. Content player 215 may initially request and receive the streaming content via unicast. Nine unicast content segments (labeled as S0 through S9, where "uc" indicates a particular segment was received via unicast) are illustrated. Assume segment S6, shown with shading, corresponds to a content segment that was either not received or was received with more than a threshold quantity of errors. Unicast component 320 may request that this segment be resent, via unicast, to mobile device 210. For example, unicast component 320 may request retransmission of the missing segment from a base station 235 or from content provider 270/275.

Referring to FIG. 6B, at some point, content player 215 may determine the requested content stream is available as a multicast stream and may begin to receive the content stream via a multicast channel. As shown, segments S9 through S11 may be received via multicast (where "mc" indicates a particular segment was received via multicast). Of these segments, segment S10 (shown shaded) may not have been received or may have been received with errors. Additionally, assume segment S6, which was previously not correctly received, is received, by unicast component 320, as a unicast segment. The new version of segment S6 may be written to the content buffer before segment S6 is used by playback component 340 to play the content stream to the user.

Referring to FIG. 6C, assume three additional content segments have been received and written to the content buffer (labeled as content segments S12 through S14). The three additional content segments may have been received via multicast. Additionally, assume segment S10, which was not correctly received during the multicast transmission, is received, by unicast component 320, as a unicast segment. The new version of segment S10 may be written to the content buffer before segment S10 is used by playback component 340 to play the content stream to the user. In this manner, multicast and unicast transmission may be concurrently used to seamlessly receive a content stream over a wireless network.

Figure 7:
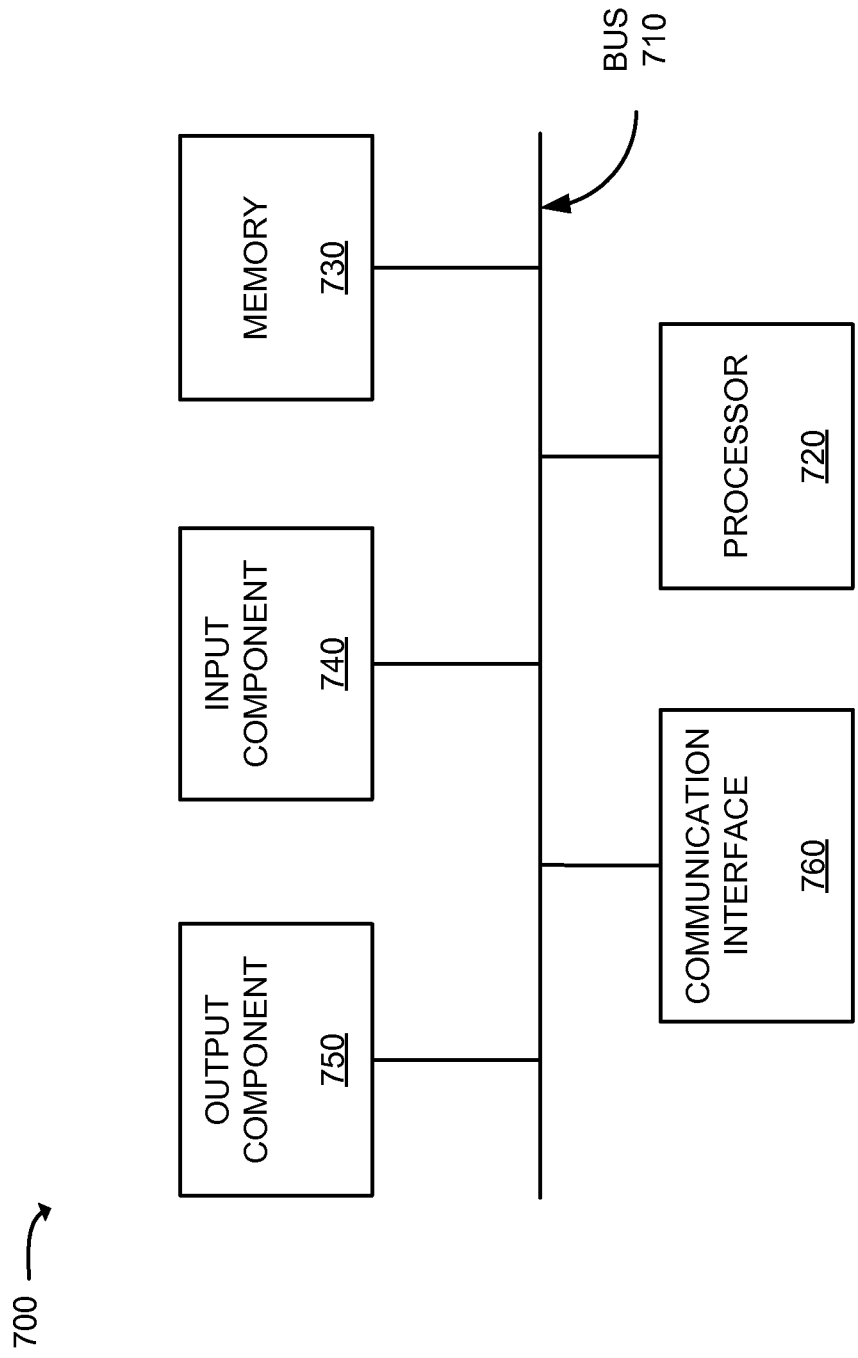
FIG. 7 is a diagram of example components of a device.

FIG. 7 is a diagram of example components of device 700. One or more of the devices described above (e.g., with respect to FIGS. 1A, 1B, 2, 3, 4, and/or 6A-6C) may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may include processing circuitry to interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes (LEDs), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a Bluetooth radio, a cellular radio transceiver, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks have been described with regard to FIG. 5, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A mobile device comprising:
   a memory device storing a set of processor-executable instructions; and
   a processor configured to execute the processor-executable instructions, wherein executing the processor-executable instructions causes the processor to:
   receive a request, from a user of the mobile device, to play streaming content at the mobile device;
   receive, from a wireless network, and using a multicast technique, a sequence of content segments that correspond to the requested streaming content;
   determine when a content segment is missing from the sequence of content segments;
   request, in response to the determination of the missing content segment, the missing content segment, from the wireless network, using a unicast technique;

receive, via the unicast technique, the missing content segment;

store the received sequence of content segments and the received missing content segment in a buffer, wherein the buffer is associated with a first value defining a size of the buffer and a second value defining a portion of the buffer for which playback of the requested content is restricted;

insert the received missing content segment into the sequence of content segments to obtain the sequence of content segments as a sequence that includes content segments received using both multicast and unicast techniques; and play, using the sequence of content segments, including the content received via the unicast technique, the requested content.

2. The mobile device of claim 1, wherein the processor-executable instructions further include instructions to cause the processor to:

initially request the sequence of the content segments using the unicast technique; and cease reception of the content segments, using the unicast technique, when the sequence of content segments begin to be received using the multicast technique.

3. The mobile device of claim 1, wherein the determination that the content segment is missing from the sequence of content segments includes at least one of:

a determination that the content segment was not received, or a determination that a quality of a particular received content segment is below a threshold.

4. The mobile device of claim 1, wherein the streaming content corresponds to a Moving Picture Experts Group-Dynamic Adaptive Streaming over HTTP (Hypertext Transfer Protocol) (MPEG-DASH) content stream.

5. The mobile device of claim 1, wherein playing the requested content includes reading the received sequence of content segments from the buffer without reading any of the content segments that are associated with the portion of the buffer for which playback of the requested content is restricted.

6. The mobile device of claim 1, wherein the second value is selected, based on conditions of the wireless network, to allow for enough time for the missing content segments to be received via the unicast technique.

7. A method, implemented by a mobile device, the method comprising:

receiving a request, from a user of the mobile device, to play streaming content at the mobile device;

receiving, from a wireless network, and using a multicast technique, a sequence of content segments that correspond to the requested streaming content, wherein receiving the sequence of content segments includes:

storing the received sequence of content segments in a buffer, wherein the buffer is associated with a first value defining a size of the buffer and a second value defining a portion of the buffer for which playback of the requested content is restricted;

determining when a content segment is missing from the sequence of content segments;

requesting, in response to the determination of the missing content segment, the missing content segment, from the wireless network, using a unicast technique;

receiving, via the unicast technique, the missing content segment;

inserting the received missing content segment into the sequence of content segments to obtain the sequence of content segments as a sequence that includes content segments received using both the multicast and unicast techniques; and playing, using the sequence of content segments, including the content received via the unicast technique, the requested content.

8. The method of claim 7, wherein the method further comprises:

initially requesting the sequence of the content segments using the unicast technique; and ceasing reception of the content segments, using the unicast technique, when the sequence of content segments begin to be received using the multicast technique.

9. The method of claim 7, wherein the determination that the content segment is missing from the sequence of content segments includes at least one of:

a determination that the content segment was not received, or a determination that a quality of the received content segment is below a threshold.

10. The method of claim 7, wherein the streaming content corresponds to a Moving Picture Experts Group-Dynamic Adaptive Streaming over HTTP (Hypertext Transfer Protocol) (MPEG-DASH) content stream.

11. The method of claim 7, wherein playing the requested content includes reading the received sequence of content segments from the buffer without reading any of the content segments that are associated with the portion of the buffer for which playback of the requested content is restricted.

12. The method of claim 7, wherein the second value is selected, based on conditions of the wireless network, to allow for enough time for the missing content segments to be received via the unicast techniques.

13. A mobile device comprising:

a multicast component to receive, from a wireless network, a multicast content stream, corresponding to content that was requested by a user of the mobile device, and to output content segments corresponding to the multicast content stream;

a unicast component to:

request, from the wireless network, a particular content segment corresponding to the content, receive, from the wireless network and as unicast data, the particular content segment, and output the particular content segment;

a segment buffer to store the content segments output by the multicast component and the unicast component as a sequence of content segments corresponding to the requested content, wherein the segment buffer is associated with a first value defining a size of the segment buffer and a second value defining a portion of the segment buffer for which playback of the requested content is restricted; and a playback component to read the content segments from the segment buffer and to play, based on the read content segments, the requested content.

14. The mobile device of claim 13, wherein the particular content segment corresponds to a content segment that was not correctly received, in the multicast content stream, by the multicast component.

15. The mobile device of claim 13, wherein the unicast component is further to:

initially request the content stream as a unicast transmission; and cease reception of the unicast content stream when the multicast component begins to receive the content stream.

16. The mobile device of claim 13, wherein the content stream corresponds to a Moving Picture Experts Group-Dynamic Adaptive Streaming over HTTP (Hypertext Transfer Protocol) (MPEG-DASH) content stream.

17. The mobile device of claim 13, wherein the second value is selected, based on conditions of the wireless network, to allow enough time for the particular content segment to be requested and received by the unicast component.

18. The mobile device of claim 1, wherein the second value corresponds to a minimum delay between receiving a particular content segment via the multicast technique and playing the particular content.

19. The method of claim 7, wherein the second value corresponds to a minimum delay between receiving a particular content segment via the multicast technique and playing the particular content.

20. The mobile device of claim 13, wherein the second value corresponds to a minimum delay between receiving a particular content segment via the multicast technique and playing the particular content.

* * * * *